United States Patent
Fukukawa et al.

(10) Patent No.: US 10,377,416 B2
(45) Date of Patent: Aug. 13, 2019

(54) DRIVING ASSISTANCE DEVICE

(71) Applicants: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

(72) Inventors: Shogi Fukukawa, Nagoya (JP); Norio Imai, Anjo (JP); Motokatsu Tomozawa, Nagoya (JP); Motonari Obayashi, Nagakute (JP); Kiyoshi Takahashi, Hekinan (JP); Hironobu Ishijima, Toyota (JP)

(73) Assignees: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

( * ) Notice: Subject to any disclaimer, the term of this patent is extended or adjusted under 35 U.S.C. 154(b) by 147 days.

(21) Appl. No.: 15/509,633

(22) PCT Filed: Sep. 10, 2015

(86) PCT No.: PCT/JP2015/075694
§ 371 (c)(1),
(2) Date: Mar. 8, 2017

(87) PCT Pub. No.: WO2016/039410
PCT Pub. Date: Mar. 17, 2016

(65) Prior Publication Data
US 2017/0259847 A1    Sep. 14, 2017

(30) Foreign Application Priority Data

Sep. 12, 2014   (JP) ................................ 2014-186766

(51) Int. Cl.
*B62D 6/00*   (2006.01)
*B62D 15/02*  (2006.01)
(Continued)

(52) U.S. Cl.
CPC ............. *B62D 6/002* (2013.01); *B60W 30/06* (2013.01); *B62D 6/00* (2013.01); *B62D 6/08* (2013.01);
(Continued)

(58) Field of Classification Search
CPC ........ B62D 6/002; B62D 6/08; B62D 15/025; B62D 6/00; B62D 15/0285; B60W 30/06; G08G 1/168
See application file for complete search history.

(56) References Cited

U.S. PATENT DOCUMENTS 6,476,730 B2 * 11/2002 Kakinami ............. B60Q 9/005
340/435
6,654,670 B2 * 11/2003 Kakinami ............. B60Q 9/005
348/119
(Continued)

FOREIGN PATENT DOCUMENTS

| EP | 2199188 A2 * | 6/2010 | ........... B62D 15/027 |
| JP | 2003-175852 A | 6/2003 | |

(Continued)

OTHER PUBLICATIONS

Notification of Reason for Refusal for JP Application No. 2014-186766 dated May 30, 2016.
(Continued)

*Primary Examiner* — Jelani A Smith
*Assistant Examiner* — Majdi Alsomiri
(74) *Attorney, Agent, or Firm* — Sughrue Mion, PLLC

(57) ABSTRACT

A driving assistance device including a steering control unit that, when a steering angle of a wheel of the vehicle from a first steering angle on one side of a neutral position to a second steering angle on the other side and the state of a vehicle is switched from a first state that is an advancing state or a reversing state to a second state that is the other of
(Continued)

the advancing state or the reversing state, controls the steering angle so as to cause the steering angle to start to be directed from the first steering angle toward the second steering angle before the state of the vehicle becomes the second state and to be directed from a third steering angle in between the first steering angle and the second steering angle toward the second steering angle when the state of the vehicle is the second state.

4 Claims, 7 Drawing Sheets

(51) Int. Cl.
  *B62D 6/08* (2006.01)
  *B60W 30/06* (2006.01)
  *G08G 1/16* (2006.01)
(52) U.S. Cl.
  CPC ........ *B62D 15/025* (2013.01); *B62D 15/0285* (2013.01); *G08G 1/168* (2013.01)

(56) References Cited

U.S. PATENT DOCUMENTS

| | | | | |
|---|---|---|---|---|
| 9,180,911 | B2* | 11/2015 | Yoshihama | B60W 50/10 |
| 2001/0026317 | A1* | 10/2001 | Kakinami | B60Q 9/005 |
| | | | | 348/148 |
| 2002/0128750 | A1* | 9/2002 | Kakinami | B60Q 9/005 |
| | | | | 701/1 |
| 2013/0197713 | A1* | 8/2013 | Yoshihama | B60W 50/10 |
| | | | | 701/1 |
| 2017/0008557 | A1* | 1/2017 | Mitsumoto | B62D 1/286 |

FOREIGN PATENT DOCUMENTS

| | | |
|---|---|---|
| JP | 2003-237511 A | 8/2003 |
| JP | 2006-347460 A | 12/2006 |
| JP | 2010-143465 A | 7/2010 |

OTHER PUBLICATIONS

International Search Report for PCT/JP2015/075694 dated Dec. 1, 2015.

* cited by examiner

DRIVING ASSISTANCE DEVICE

This application is national stage application of International Application No. PCT/JP2015/075694, filed Sep. 10, 2015, which designates the United States, incorporated herein by reference, and which claims the benefit of priority from Japanese Patent Application No. 2014-186766, filed Sep. 12, 2014, the entire contents of which are incorporated herein by reference.

TECHNICAL FIELD

Embodiments of the present invention relate to a driving assistance device.

BACKGROUND ART

Conventionally, there has been known a driving assistance device that performs automatic steering in causing a parallel parked vehicle to exit a parking position, for example.

CITATION LIST

Patent Literature

Patent Document 1: Japanese Patent Application Laid-open No. 2003-237511

SUMMARY OF INVENTION

Problem to be Solved by the Invention

In this kind of driving assistance device, when the number of times a vehicle is turned is as few as possible, exiting in a shorter time is made easier. However, when wheels are turned with the vehicle stationary in turning in order to reduce the number of times the vehicle is turned, the wheels wear, or the electric power consumption of an actuator of, for example, electric power steering increases. Thus, it is meaningful to achieve a driving assistance device that easily reduces the number of times the vehicle is turned while reducing the wear of the wheels and the increase in the electric power consumption of the actuator.

Means for Solving Problem

A driving assistance device of the embodiment comprises a steering control unit that, in the case of changing a steering angle of a wheel of the vehicle from a first steering angle on one side of a neutral position to a second steering angle on another side of the neutral position when a state of the vehicle is switched from a first state to a second state, controls the steering angle so as to cause the steering angle to start to be directed from the first steering angle toward the second steering angle before the state of the vehicle becomes the second state, and controls the steering angle so as to cause the steering angle to be directed from a third steering angle in between the first steering angle and the second steering angle toward the second steering angle when the state of the vehicle is the second state, the first state being one of an advancing state and a reversing state, the second state being another of the advancing state and the reversing state. Consequently, in the present configuration, the steering angle starts to be directed from the first steering angle toward the second steering angle before the state of the vehicle becomes the second state, for example, and the number of times the vehicle is turned is reduced more easily than a case in which the steering angle starts to be directed from the first steering angle toward the second steering angle after the state of the vehicle becomes the second state. In addition, in the configuration, the steering angle is directed from the third steering angle in between the first steering angle and the second steering angle toward the second steering angle when the state of the vehicle is the second state, and the wheel is not turned with the vehicle stationary at least until the steering angle becomes the second steering angle from the third steering angle, whereby the wear of the wheel and an increase in the electric power consumption of the actuator can be reduced compared with a case in which the wheel is turned with the vehicle stationary until the steering angle becomes the second steering angle from the first steering angle.

In the driving assistance device of the embodiment, the steering control unit controls the steering angle so as to cause the steering angle to start to be directed from the first steering angle toward the second steering angle when the state of the vehicle is the first state. Consequently, in the configuration, the steering angle can be changed from the first steering angle to the second steering angle without turning the wheel with the vehicle stationary, and the wear of the wheel and the increase in the electric power consumption of the actuator can be reduced compared with a case in which the wheel is turned with the vehicle stationary until the steering angle becomes the second steering angle from the first steering angle.

In the driving assistance device of the embodiment, wherein the steering control unit controls the steering angle so as to cause the steering angle to start to be directed from the first steering angle toward the second steering angle when the state of the vehicle is a stationary state midway through a process during which the first state is switched to the second state. Consequently, in the configuration, the wheel is turned with the vehicle stationary only in a partial section in the process during which the steering angle is directed from the first steering angle toward the second steering angle, and the wear of the wheel and the increase in the electric power consumption of the actuator can be reduced compared with a case in which the wheel is turned with the vehicle stationary in the entire section in the process during which the steering angle becomes the second steering angle from the first steering angle.

The driving assistance device of the embodiment further comprises a detection unit that detects a distance between an obstacle in front of the vehicle in a stationary state and an obstacle in the rear of the vehicle, wherein the steering control unit controls the steering angle so as to cause the steering angle to start to be directed from the first steering angle toward the second steering angle when the state of the vehicle is the first state when the distance is equal to or more than a threshold, and controls the steering angle so as to cause the steering angle to start to be directed from the first steering angle toward the second steering angle when the state of the vehicle is a stationary state midway through a process during which the first state is switched to the second state when the distance is less than the threshold. Consequently, in the configuration, the amount of turning of the wheel with the vehicle stationary is adjusted in accordance with the distance between the obstacle in front of the vehicle and the obstacle in the rear of the vehicle to enable the vehicle to escape from between the obstacles.

The driving assistance device of the embodiment further comprises a travel route calculation unit that calculates a travel route from a current position of the vehicle to a target position. Consequently, in the configuration, the travel route from the current position of the vehicle to the target position can be calculated.

BRIEF DESCRIPTION OF DRAWINGS

FIG. 1 is an exemplary perspective view illustrating a state in which part of a cabin of a vehicle according to an embodiment is seen through.

DESCRIPTION OF EMBODIMENTS

Exemplary embodiments of the present invention will be disclosed below. Configurations according to the embodiments described below, and operations, results, and effects achieved by these configurations are merely exemplary. The present invention can achieve any configuration other than the configurations disclosed in the embodiments below. The present invention can obtain at least one of various kinds of effects (including secondary effects) resulting from the basic configurations.

A vehicle 1 according to the embodiment may be an automobile having an internal combustion engine (not illustrated) as a drive source, that is, an internal combustion engine automobile, may be an automobile having an electric motor (not illustrated) as a drive source, that is, an electric vehicle or a fuel cell electric vehicle, may be a hybrid vehicle having both of the internal combustion engine and the electric motor as drive sources, or may be an automobile having other drive sources, for example. The vehicle 1 can mount a variety of gear shifters, and can mount a variety of devices required to drive an internal combustion engine and an electric motor, such as systems and components. The style, number, layout, and the like of equipment involved in driving wheels 3 of the vehicle 1 can be set in various ways.

Figure 1:
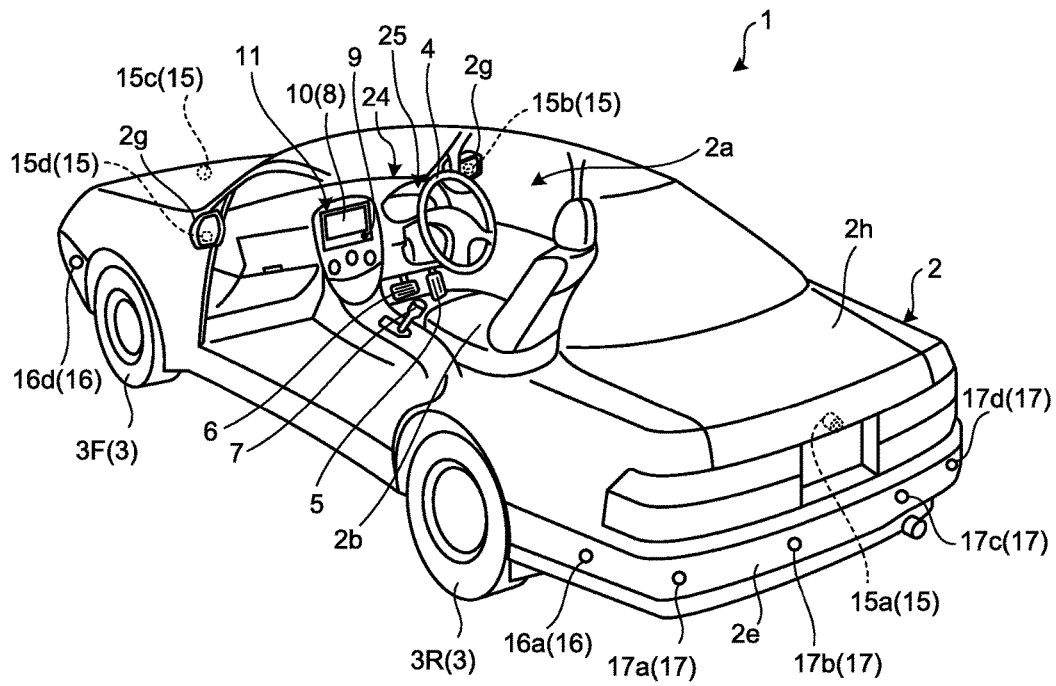

As illustrated in FIG. 1, a vehicle body 2 constitutes a cabin 2a in which an occupant (not illustrated) rides. In the cabin 2a, a steering unit 4, an accelerating operation unit 5, a braking operation unit 6, a gear shift operating unit 7, and the like are provided in a state of facing a seat 2b of a driver as an occupant. The steering unit 4 is a steering wheel protruding from a dash board 24, for example. The accelerating operation unit 5 is an accelerator pedal positioned at the driver's foot, for example. The braking operation unit 6 is a brake pedal positioned at the driver's foot, for example. The gear shift operating unit 7 is a shift lever protruding from a center console, for example. The steering unit 4, the accelerating operation unit 5, the braking operation unit 6, and the gear shift operating unit 7 are not limited to the above.

In the cabin 2a, a display device 8 as a display output unit and a sound output device 9 as a sound output unit are provided. The display device 8 is a liquid crystal display (LCD) or an organic electroluminescent display (OELD), for example. The sound output device 9 is a speaker, for example. The display device 8 is covered by a transparent operation input unit 10 such as a touch panel. An occupant can visually identify an image displayed on a display screen of the display device 8 via the operation input unit 10. The occupant can also perform operation input by touching, pressing, manipulating, or operating the operation input unit 10 with the fingers and the like at a position corresponding to the image displayed on the display screen of the display device 8. The display device 8, the sound output device 9, and the operation input unit 10 are provided in a monitor device 11 positioned in the center in a vehicle width direction, that is, in the right and left direction of the dash board 24, for example. The monitor device 11 can have an operation input unit (not illustrated) such as a switch, a dial, a joystick, and a push button. A sound output device (not illustrated) can be arranged at positions other than the monitor device 11 in the cabin 2a, and the sound output device 9 of the monitor device 11 and another sound output device can output sound. The monitor device 11 can also be used as a navigation system and an audio system, for example.

Figure 3:
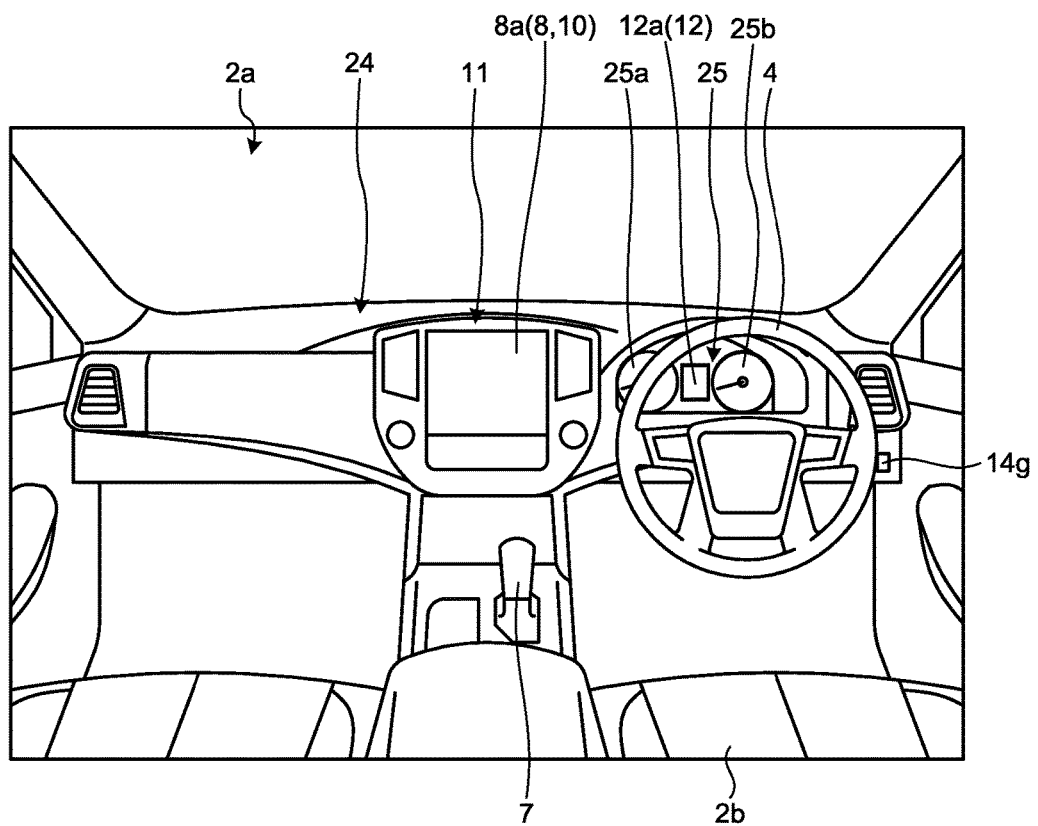
FIG. 3 is a diagram of an example of a dash board of the vehicle according to the embodiment when viewed from the rear side of the vehicle.

In the cabin 2a, a display device 12 different from the display device 8 is provided. As illustrated in FIG. 3, the display device 12 is arranged on an instrument panel unit 25 of the dash board 24, for example, and is positioned between a speed indicating unit 25a and a revolution indicating unit 25b in the substantially center of the instrument panel unit 25. The size of a screen 12a of the display device 12 is smaller than that of a screen 8a of the display device 8. The display device 12 can primarily display an image indicating information on driving assistance of the vehicle 1. The amount of information displayed on the display device 12 may be smaller than that displayed on the display device 8. The display device 12 is an LCD or an OELD, for example. The display device 8 may display information displayed on the display device 12.

Figure 2:
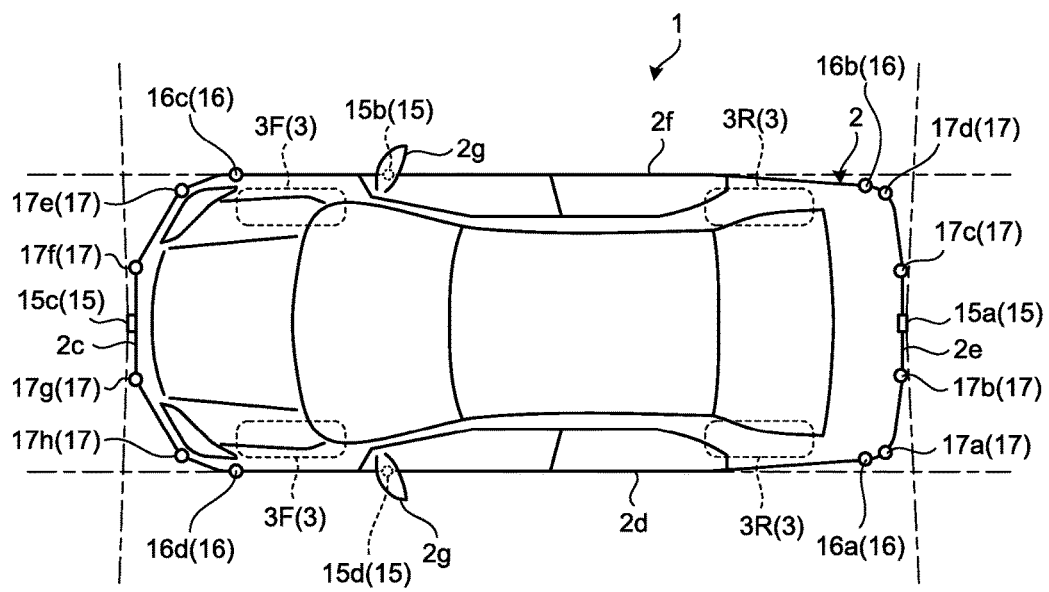
FIG. 2 is an exemplary plan view (bird's eye view) of the vehicle according to the embodiment.
Figure 4:
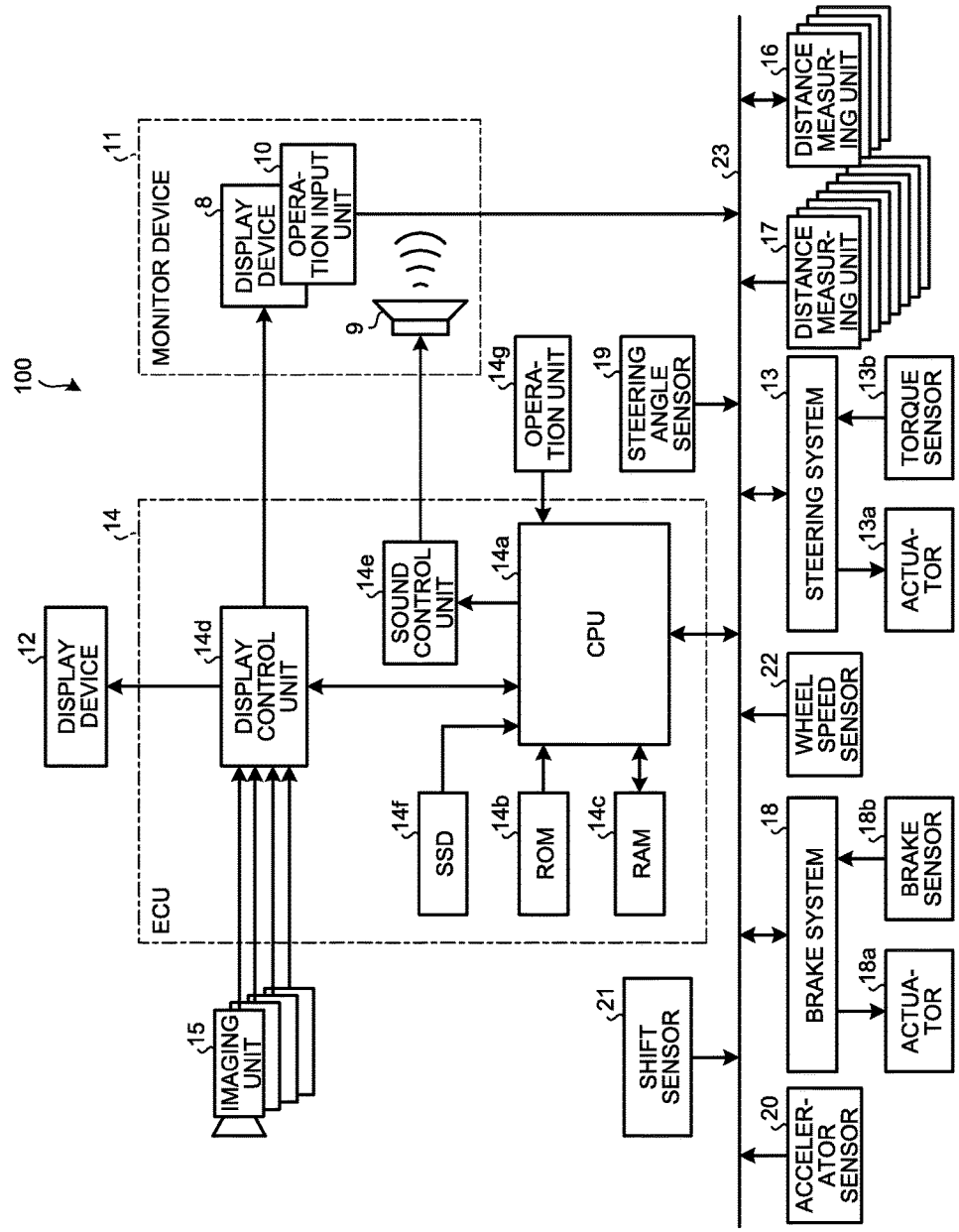
FIG. 4 is an exemplary block diagram illustrating a configuration of a driving assistance system according to the embodiment.

As illustrated in FIGS. 1 and 2, the vehicle 1 is a four-wheel automobile and has two right and left front wheels 3F and two right and left rear wheels 3R. All of these four wheels 3 can be configured to be steered. As illustrated in FIG. 4, the vehicle 1 has a steering system 13 configured to steer at least two wheels 3. The steering system 13 has an actuator 13a and a torque sensor 13b. The steering system 13 is electrically controlled by an electronic control unit (ECU) 14 and the like to operate the actuator 13a. The steering system 13 is an electric power steering system or a steer-by-wire (SBW) system, for example. The steering system 13 causes the actuator 13a to add torque or assist torque to the steering unit 4 to assist steering effort or causes the actuator 13a to steer the wheel(s) 3. In this case, the actuator 13a may steer one wheel 3 or a plurality of wheels 3. The torque sensor 13b detects torque given to the steering unit 4 by the driver, for example.

As illustrated in FIG. 2, four imaging units 15a to 15d, for example, are provided as a plurality of imaging units 15 in the vehicle body 2. The imaging units 15 are a digital camera that incorporates an imaging element thereinto, such as a charge coupled device (CCD) and a CMOS image sensor (CIS), for example. The imaging units 15 can output moving image data at a predetermined frame rate. The imaging units 15 each have a wide-angle lens or a fish-eye lens and can photograph the range from 140° to 190°, for example, in the horizontal direction. The optical axis of each of the imaging units 15 is set to be directed obliquely downward. Thus, the imaging units 15 sequentially photograph the external environment surrounding the vehicle body 2 including road surfaces on which the vehicle 1 can travel and areas in which the vehicle 1 can be parked, and output it as captured image data.

The imaging unit 15a is positioned at an end 2e on the rear side of the vehicle body 2, and is provided to a wall in the lower portion of a door 2h of a rear trunk, for example. The imaging unit 15b is positioned at an end 2f on the right side of the vehicle body 2, and is provided to a door mirror 2g on the right side, for example. The imaging unit 15c is positioned at an end 2c on the front side of the vehicle body 2, that is, on the front side in the fore-and-aft direction of the vehicle, and is provided to a front bumper and the like, for example. The imaging unit 15d is positioned at an end 2d on the left side of the vehicle body 2, that is, on the left side in the vehicle width direction, and is provided to a door mirror 2g as a protruding part on the left side, for example. The ECU 14 can perform arithmetic processing and image processing based on image data obtained by the imaging units 15 to generate an image having a wider angle of visibility or generate a virtual bird's eye view image when the vehicle 1 is viewed from above. The bird's eye view image can also be referred to as a plane image.

The ECU 14 also identifies a division line and the like designated on road surfaces around the vehicle 1 using images obtained by the imaging units 15, and detects (extracts) a parking section designated by the division line.

As illustrated in FIGS. 1 and 2, four distance measuring units 16a to 16d and eight distance measuring units 17a to 17h, for example, are provided as a plurality of distance measuring units 16 and 17 in the vehicle body 2. Each of the distance measuring units 16 and 17 is a sonar that emits ultrasound and captures its reflected wave, for example. The sonar can also be referred to as a sonar sensor or an ultrasonic detector. The ECU 14 can measure the presence of an object such as an obstacle located around the vehicle 1 and the distance to the object, based on detection results from the distance measuring units 16 and 17. Specifically, the distance measuring units 16 and 17 are examples of a detection unit configured to detect objects. The distance measuring units 17 can be used to detect objects at a relatively short distance, for example, while the distance measuring units 16 can be used to detect objects at a relatively long distance that is farther than the objects the distance measuring units 17 detect, for example. The distance measuring units 17 can be used to detect objects ahead of and behind the vehicle 1, while the distance measuring units 16 can be used to detect objects at the lateral sides of the vehicle 1, for example.

As illustrated in FIG. 4, in a driving assistance system 100, a brake system 18, a steering angle sensor 19, an accelerator sensor 20, a shift sensor 21, a wheel speed sensor 22, and the like are electrically connected via an in-vehicle network 23 as an electric telecommunication line, in addition to the ECU 14, the monitor device 11, the steering system 13, and the distance measuring units 16 and 17. The in-vehicle network 23 is configured as a controller area network (CAN), for example. The ECU 14 can control the steering system 13, the brake system 18, and the like by transmitting control signals thereto via the in-vehicle network 23. The ECU 14 can also receive detection results from the torque sensor 13b, a brake sensor 18b, the steering angle sensor 19, the distance measuring units 16, the distance measuring units 17, the accelerator sensor 20, the shift sensor 21, the wheel speed sensor 22, and the like and operation signals from the operation input unit 10 and the like via the in-vehicle network 23.

The ECU 14 has a central processing unit (CPU) 14a, a read only memory (ROM) 14b, a random access memory (RAM) 14c, a display control unit 14d, a sound control unit 14e, and a solid state drive (SSD, flash memory) 14f, for example. The CPU 14a can perform a variety of arithmetic processing and control, such as image processing concerned with images displayed on the display devices 8 and 12, determination of a travel target position of the vehicle 1, arithmetic processing of a travel route of the vehicle 1, judgment as to whether interference with an object is present, automatic control of the vehicle 1, and release of automatic control. The CPU 14a can read a computer program installed and stored in a nonvolatile memory such as the ROM 14b, and perform arithmetic processing in accordance with the computer program. The RAM 14c temporarily stores therein various types of data to be used for arithmetic processing performed by the CPU 14a. The display control unit 14d primarily performs image processing that uses the image data obtained by the imaging units 15 and composition of image data displayed on the display device 8, out of the arithmetic processing performed by the ECU 14. The sound control unit 14e primarily processes sound data output by the sound output device 9, out of the arithmetic processing performed by the ECU 14. The SSD 14f is a rewritable nonvolatile memory and can store therein data even when the power of the ECU 14 is turned off. The CPU 14a, the ROM 14b, the RAM 14c, and the like can be integrated in the same package. The ECU 14 may have a configuration in which other logical operation processor such as a digital signal processor (DSP) or a logic circuit is used instead of the CPU 14a. A hard disk drive (HDD) may be provided instead of the SSD 14f, and the SSD 14f and the HDD may be provided separately from the ECU 14.

The brake system 18 is an anti-lock brake system (ABS) that prevents locking of the brake, electronic stability control (ESC) that prevents a skid of the vehicle 1 during cornering, an electric brake system that increases braking force (performs brake assist), or brake by wire (BBW), for example. The brake system 18 applies braking force to the wheels 3 and eventually to the vehicle 1 via an actuator 18a. The brake system 18 can perform a variety of control by detecting locking of the brake, idling of the wheels 3, and a sign of a skid based on the rotational difference between the right and left wheels 3. The brake sensor 18b is a sensor configured to detect the position of a movable part of the braking operation unit 6, for example. The brake sensor 18b can detect the position of a brake pedal serving as the movable part. The brake sensor 18b includes a displacement sensor.

The steering angle sensor 19 is a sensor configured to detect the steering amount of the steering unit 4 such as a steering wheel, for example. The steering angle sensor 19 is configured by using a Hall element, for example. The ECU 14 acquires the steering amount of the steering unit 4 by the driver, the steering amount of each wheel 3 during automatic steering, and the like from the steering angle sensor 19 to perform a variety of control. The steering angle sensor 19 detects the turning angle of a turning part included in the steering unit 4. The steering angle sensor 19 is an example of an angle sensor.

The accelerator sensor 20 is a sensor configured to detect the position of a movable part of the accelerating operation unit 5, for example. The accelerator sensor 20 can detect the position of an accelerator pedal serving as the movable part. The accelerator sensor 20 includes a displacement sensor.

The shift sensor 21 is a sensor configured to detect the position of a movable part of the gear shift operation unit 7, for example. The shift sensor 21 can detect the position of a lever, an arm, a button, and the like serving as the movable part. The shift sensor 21 may include a displacement sensor or may be configured as a switch.

The wheel speed sensor 22 is a sensor configured to detect the rotation amount and the rotation speed per unit time of the wheel(s) 3. The wheel speed sensor 22 outputs a wheel speed pulse number indicating the detected rotation speed as a sensor value. The wheel speed sensor 22 is configured by using a Hall element, for example. The ECU 14 calculates the travel amount and the like of the vehicle 1 based on the sensor value acquired from the wheel speed sensor 22 to perform a variety of control. The wheel speed sensor 22 is provided in the brake system 18 in some cases. In such cases, the ECU 14 acquires the detection result of the wheel speed sensor 22 via the brake system 18. The ECU 14 can determine a wheel speed based on the sensor value acquired from the wheel speed sensor 22. In this case, the sensor value of one wheel speed sensor 22 may be used, or the sensor values of a plurality of wheel speed sensors 22 may be used.

The configurations, arrangements, and electrical connections of various sensors and actuators described above are merely examples, and can be set (changed) in various ways.

Figure 5:
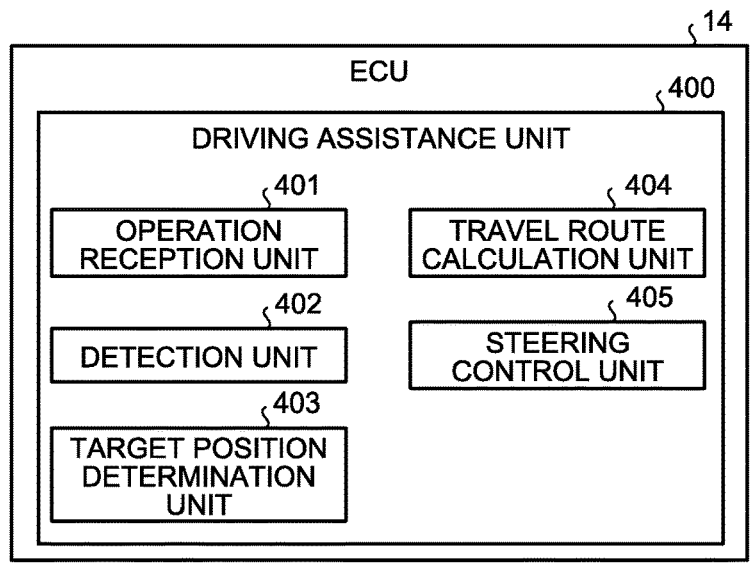
FIG. 5 is an exemplary block diagram illustrating a configuration of an ECU of the driving assistance system according to the embodiment.

The following describes a configuration of a driving assistance unit 400 achieved within the ECU 14. As illustrated in FIG. 5, the driving assistance unit 400 includes an operation reception unit 401, a detection unit 402, a target position determination unit 403, a travel route calculation unit 404, and a steering control unit 405.

The configurations within the driving assistance unit 400 illustrated in FIG. 5 are achieved by causing the CPU 14a included in the ECU 14 in FIG. 4 to execute a computer program stored in the ROM 14b. In other words, the driving assistance unit 400 executes the computer program stored in the ROM 14b to achieve the operation reception unit 401, the detection unit 402, the target position determination unit 403, the travel route calculation unit 404, and the steering control unit 405. These units may be achieved by using hardware.

Figure 6:
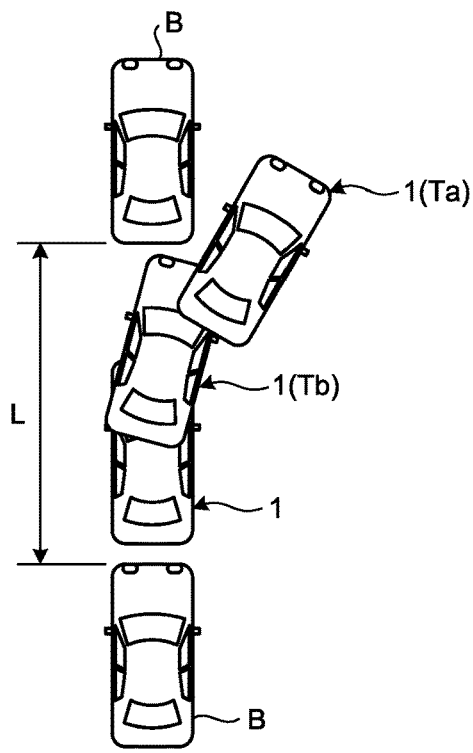
FIG. 6 is an exemplary illustrative diagram for illustrating the exit of a parallel parked vehicle according to the embodiment.

The driving assistance unit 400 can assist the exit of a parallel parked vehicle, for example. When a parallel parked vehicle 1 exits as illustrated in FIG. 6, for example, the driving assistance unit 400 can detect a distance L between an obstacle B in front of the vehicle 1 and an obstacle B in the rear of the vehicle 1, determine the necessity of turning based on the distance L, determine the travel route of the vehicle 1, and control the vehicle 1 so as to cause the vehicle 1 to travel along the travel route.

The operation reception unit 401 receives instruction signals (control signals) of the operation input unit 10, an operation unit 14g, and the like. The operation reception unit 401 can receive operations from the driver from these instruction signals. The operation unit 14g is a push button or a switch, for example.

The detection unit 402 detects the obstacles B around the vehicle 1 based on the data acquired from the imaging units 15 as object detection units, the distance measuring units 16 and 17, and the like. This detection reveals a relative positional relation of the vehicle 1 and the obstacles B and the positions of the vehicle 1 and the obstacles B, the areas of the obstacles B, and the like in a two-dimensional coordinate system as the standard of control. The detection unit 402 can detect the distance L between the obstacle B in front of the vehicle 1 and the obstacle B in the rear of the vehicle 1 based on the data acquired from the distance measuring units 16 and 17.

The target position determination unit 403 sets a target position Ta. Specifically, the target position determination unit 403 sets the target position Ta as a position or an area designated by an operator (the driver, a passenger, or the like) by operation input (instruction input or designation input) on the operation input unit 10 corresponding to the image of a plan view (bird's eye view) containing the vehicle 1 displayed on the display device 8, for example. The target position determination unit 403 can automatically detect and set the target position Ta based on an image around the vehicle 1 acquired by the imaging units 15 corresponding to the behavior of the vehicle 1, for example. However, the method for setting the target position Ta is not limited to the above.

The travel route calculation unit 404 calculates a travel route from the current position of the vehicle 1 to the target position Ta. The travel route calculation unit 404 can perform geometric arithmetic processing corresponding to certain procedures and conditions based on the current position of the vehicle 1 and the target position Ta, to calculate the travel route of the vehicle 1. Alternatively, the travel route calculation unit 404 can refer to data on a plurality of route patterns stored in the ROM 14b, the SSD 14f, or the like to select a route pattern corresponding to the current position and the target position Ta, for example. However, the method for calculating the travel route is not limited to the above.

The travel route calculation unit 404 determines the necessity of the turning of the vehicle 1 when the vehicle 1 exits from between the obstacle B and the obstacle B based on the distance L. The turning of the vehicle 1 is an operation that changes the steering angle of the wheel 3 from one side of neutral position to the other side of the neutral position when the state of the vehicle 1 is switched from a first state that is one of an advancing state and a reversing state to a second state that is the other of the advancing state and the reversing state. As to this operation, the vehicle 1 performs switching between advancing and reversing, that is, shift change in a stationary state.

When determining that, in order for the vehicle 1 to travel to the target position, it is necessary to switch the state of the vehicle 1 from the first state to the second state and to change the steering angle of the wheel 3 from a first steering angle D1 (FIGS. 7 and 8) on one side of the neutral position to a second steering angle D2 (FIGS. 7 and 8) on the other side of the neutral position at the time of the switching, the travel route calculation unit 404 calculates a turning route.

Figure 7:
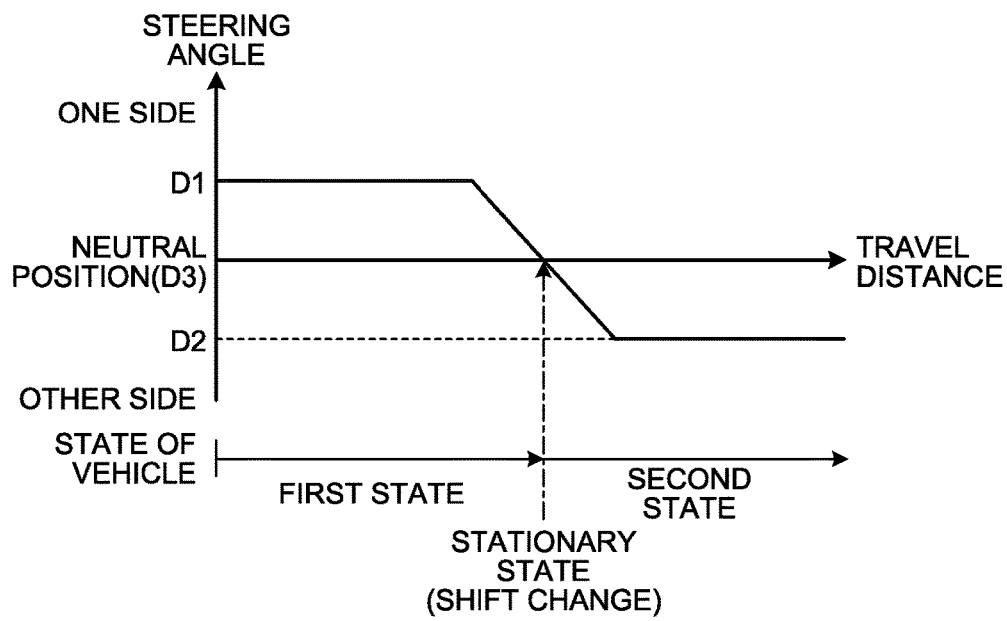
FIG. 7 is an exemplary illustrative diagram illustrating a first change of a steering angle of the vehicle according to the embodiment.
Figure 8:
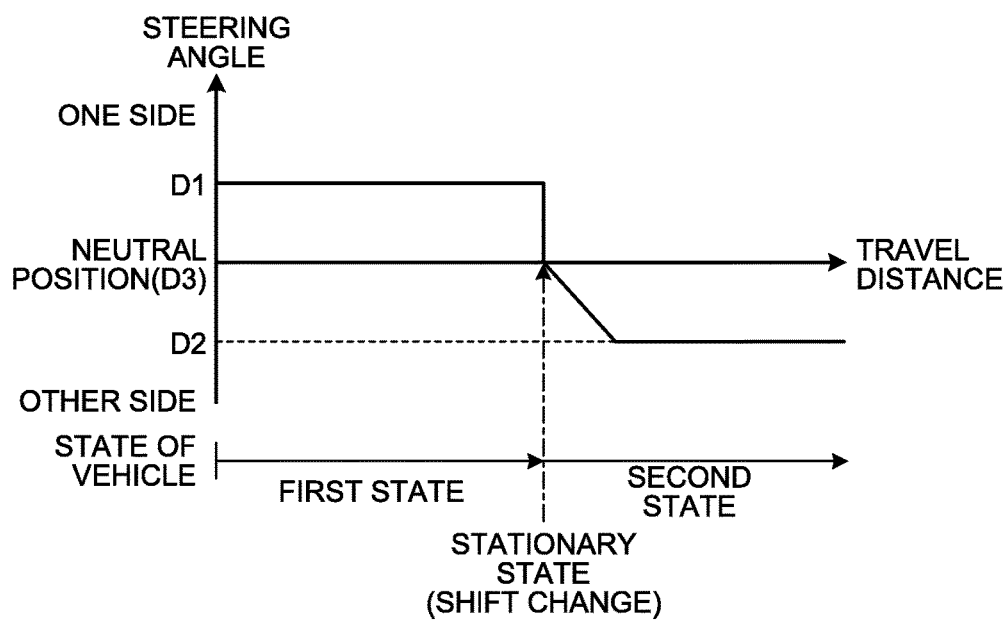
FIG. 8 is an exemplary illustrative diagram illustrating a second change of the steering angle of the vehicle according to the embodiment.

FIGS. 7 and 8 illustrate a relation between the timing of the shift change and the steering angle at the time of the turning of the vehicle 1. As illustrated in FIGS. 7 and 8, the travel route calculation unit 404 in the calculation of the turning route calculates a route in which the steering angle starts to be directed from the first steering angle D1 toward the second steering angle D2 before the state of the vehicle 1 becomes the second state and the steering angle is directed from a third steering angle D3 in between the first steering angle D1 and the second steering angle D2 toward the second steering angle D2 when the state of the vehicle 1 is the second state. The first steering angle D1 may be the maximum steering angle on the one side based on the neutral position, for example. The second steering angle D2 may be the maximum steering angle on the other side based on the neutral position, for example. The third steering angle D3 may be the neutral position (0 degree), for example.

Specifically, if the distance L is a threshold or more, the travel route calculation unit 404 calculates a route established by a first turning operation in which the steering angle starts to be directed from the first steering angle D1 toward the second steering angle D2 when the state of the vehicle 1 is the first state (FIG. 7). In the present embodiment, a route is calculated in which the steering angle changes from the first steering angle D1 to the third steering angle D3 in the first state (the advancing state, for example) and the steering angle changes from the third steering angle D3 to the second steering angle D2 in the second state (the reversing state, for example) after the shift change (the stationary state). In this case, this route is free of the turning of the wheel 3 with the vehicle stationary. The threshold is a standard for determining whether turning is enabled without the turning of the wheel 3 with the vehicle stationary and may be a value obtained by adding a certain length to the length in the fore-and-aft direction of the vehicle 1, for example.

In contrast, if the distance L is less than the threshold, the travel route calculation unit 404 calculates a route established by a second turning operation in which the steering angle starts to be directed from the first steering angle D1 toward the second steering angle D2 when the state of the vehicle 1 is a stationary state midway through a process during which the first state (the advancing state, for example) is switched to the second state (the reversing state, for example) (FIG. 8). In the present embodiment, a route is calculated in which the steering angle changes from the first steering angle D1 to the third steering angle D3 in the stationary state and the steering angle changes from the third steering angle D3 to the second steering angle D2 in the second state (the reversing state, for example) after the shift change (the stationary state). In this case, this route causes the wheel 3 to be turned with the vehicle stationary from the first steering angle D1 to the third steering angle D3 in the stationary state (partly turned with the vehicle stationary). When the distance L is less than the threshold, the travel amount of the vehicle 1 in the second state is comparatively shorter, and the steering angle D2 may be smaller than the maximum steering angle if a travel route with the maximum curvature cannot be set.

The steering control unit 405 performs the steering of the wheel 3 relative to the travel of the vehicle 1 on the travel route determined by the travel route calculation unit 404. In this process, in the present embodiment, the vehicle 1 is accelerated or decelerated (braked) in accordance with an operation on the accelerating operation unit 5 or the braking operation unit 6 by the driver. The vehicle 1 advances or reverses in accordance with an operation on the gear shift operating unit 7, that is, the shift change by the driver.

Specifically, the steering control unit 405 controls the actuator 13a of the steering system 13 in accordance with the position of the vehicle 1 so as to cause the vehicle 1 to travel along the travel route determined by the travel route calculation unit 404. In other words, as illustrated in FIGS. 7 and 8, in the case of changing the steering angle of the wheel 3 from the first steering angle D1 to the second steering angle D2 when the state of the vehicle 1 is switched from the first state to the second state, the steering control unit 405 controls the steering angle so as to cause the steering angle to start to be directed from the first steering angle D1 toward the second steering angle D2 before the state of the vehicle 1 becomes the second state and to be directed from the third steering angle D3 toward the second steering angle D2 when the state of the vehicle 1 is the second state. Specifically, if the distance L is equal to or more than the threshold, the steering control unit 405 controls the steering angle so as to cause the steering angle to start to be directed from the first steering angle D1 toward the second steering angle D2 when the state of the vehicle 1 is the first state (FIG. 7). In contrast, if the distance L is less than the threshold, the steering control unit 405 controls the steering angle so as to cause the steering angle to start to be directed from the first steering angle D1 toward the second steering angle D2 when the state of the vehicle 1 is the stationary state midway through the process during which the first state is switched to the second state.

Figure 9:
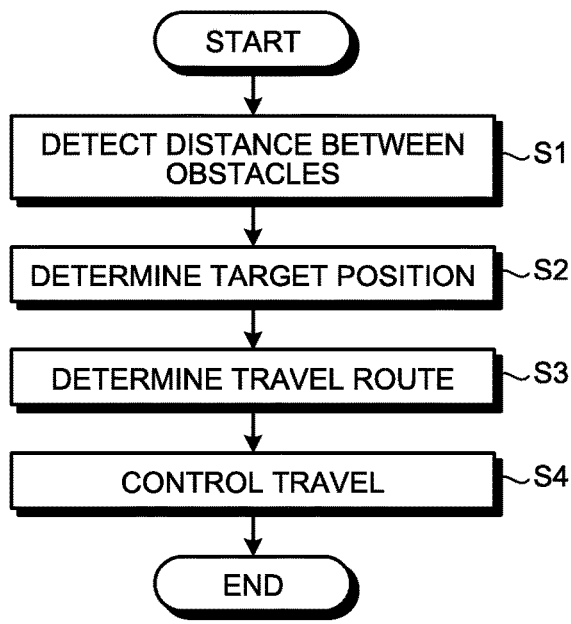
FIG. 9 is an exemplary flowchart illustrating a procedure of exit assistance processing according to the embodiment.

The following describes a procedure of processing to assist the exit of a parallel parked vehicle by the driving assistance unit 400 configured as described above with reference to FIG. 9. First, the detection unit 402 detects the distance L between the obstacle B and the obstacle B (S1). Next, the target position determination unit 403 determines a target position (S2).

Figure 10:
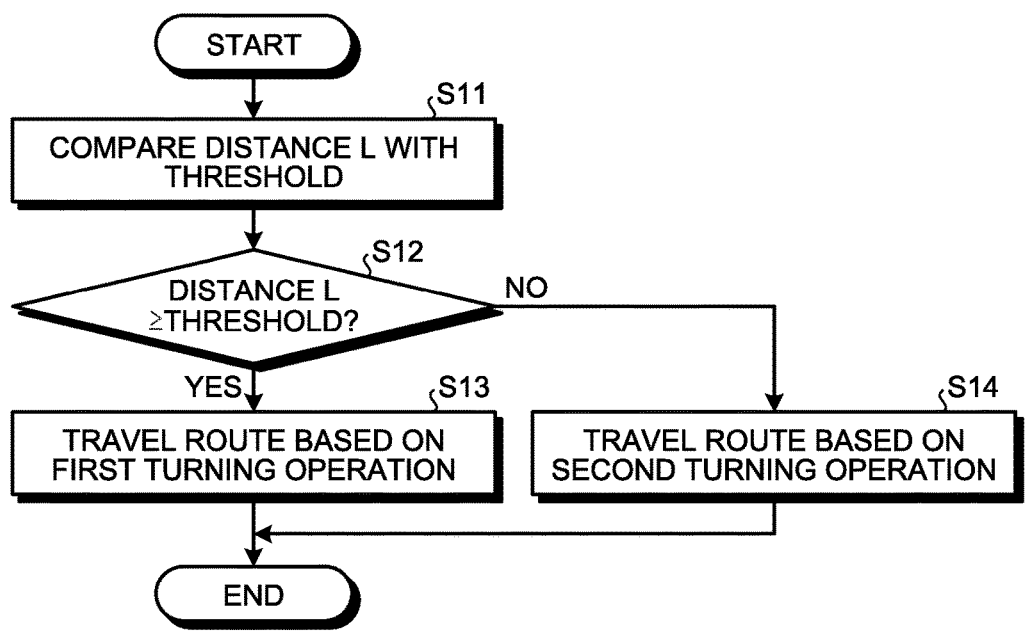
FIG. 10 is an exemplary flowchart illustrating part of a procedure of route calculation processing according to the embodiment.

Next, the travel route calculation unit 404 determines a travel route (S3). In determining the travel route, when determining that the turning of the vehicle 1 is necessary, the travel route calculation unit 404 selects a turning operation corresponding to the distance L and calculates a travel route based on the selected turning operation. Specifically, as illustrated in FIG. 10, the travel route calculation unit 404 compares the distance L with the threshold (S11). If the distance L is equal to or more than the threshold (Yes at S12), the travel route calculation unit 404 calculates a travel route based on the first turning operation (S13). In contrast, if the distance L is less than the threshold (No at S12), the travel route calculation unit 404 calculates a travel route based on the second turning operation (S14).

Referring back to FIG. 9, the steering control unit 405 controls the steering angle of the vehicle 1, that is, controls the travel of the vehicle 1 so as to cause the vehicle 1 to travel along the travel route determined by the travel route calculation unit 404 (S4). In this process, the driving assistance unit 400 performs shift change guidance that prompts the driver to stop the vehicle 1 at a target turning position Tb (FIG. 6) of the vehicle 1 and to perform shift change between advancing and reversing on the monitor device 11. In response to this shift change guidance, the driver will stop the vehicle 1 at the target turning position Tb (FIG. 6) and perform the shift change between advancing and reversing. The stopping position of the actual vehicle 1 and the timing of the shift change by an operation by the driver may deviate within a certain range relative to the target turning position Tb and the timing of the shift change indicated by the shift change guidance. When such deviation occurs, the steering control unit 405 may change or does not necessarily change the timing of steering. When the deviation is estimated to exceed or exceeds the certain range, the driving assistance unit 400 can end the processing of the exit of a parallel parked vehicle. In this process, in the present embodiment, the steering control unit 405 starts the control of the steering angle so as to cause the steering angle to be directed from the first steering angle D1 toward the second steering angle D2 before the shift change guidance is performed, for example.

Figure 11:
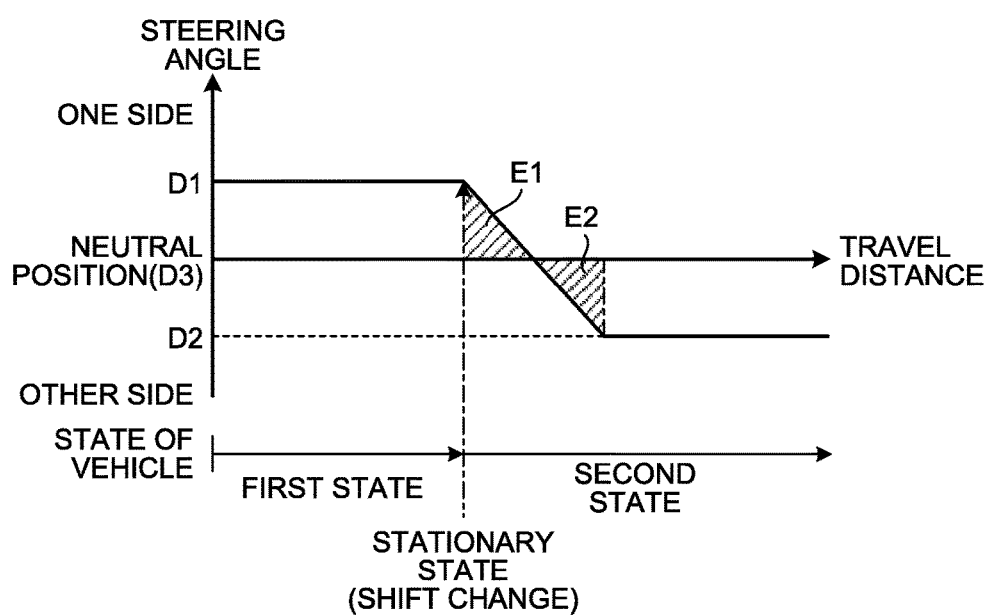
FIG. 11 is an exemplary illustrative diagram illustrating a change in a steering angle of a vehicle according to a comparative example.

FIG. 11 illustrates a change in a steering angle of a vehicle according to a comparative example. In the comparative example, after the state of the vehicle has completely switched from the first state to the second state, the steering angle is controlled to become the second steering angle D2 from the first steering angle D1. In this case, a change in the attitude, that is, the deflection angle of the vehicle by a steering amount corresponding to the area E1 in FIG. 11 and a change in the deflection angle of the vehicle by a steering amount corresponding to the area E2 cancel each other out, and a change in the deflection angle of the vehicle decreases, leading to an increase in the number of times of turning. In contrast, in the present embodiment, before the state of the vehicle 1 becomes the second state, the steering angle starts to be directed from the first steering angle D1 toward the second steering angle D2, and the cancellation of the deflection angle of the vehicle 1 can be prevented from occurring. Consequently, the present embodiment easily reduces the number of times the vehicle 1 is turned.

As described above, in the present embodiment, in the case of changing the steering angle of the wheel 3 from the first steering angle D1 on the one side of the neutral position to the second steering angle D2 on the other side of the neutral position when the state of the vehicle 1 is switched from the first state to the second state, the steering control unit 405 controls the steering angle so as to cause the steering angle to start to be directed from the first steering angle D1 toward the second steering angle D2 before the state of the vehicle 1 becomes the second state and to be directed from the third steering angle D3 toward the second steering angle D2 when the state of the vehicle is the second state. Consequently, in the present configuration, the steering angle starts to be directed from the first steering angle D1 toward the second steering angle D2 before the state of the vehicle 1 becomes the second state, for example, and the number of times the vehicle 1 is turned is reduced more easily than a case in which the steering angle starts to be directed from the first steering angle D1 toward the second steering angle D2 after the state of the vehicle 1 becomes the second state. In addition, in the configuration, the steering angle is directed from the third steering angle D3 toward the second steering angle D2 when the state of the vehicle 1 is the second state, and the wheel 3 is not turned with the vehicle stationary at least until the steering angle becomes the second steering angle D2 from the third steering angle D3, whereby the wear of the wheel 3 and an increase in the electric power consumption of the actuator 13a can be reduced compared with a case in which the wheel 3 is turned with the vehicle stationary until the steering angle becomes the second steering angle D2 from the first steering angle D1. Consequently, the increase in the electric power consumption of the actuator 13a can be reduced, and heat generation in the actuator 13a can be reduced.

In the present embodiment, the steering control unit 405 controls the steering angle so as to cause the steering angle to start to be directed from the first steering angle D1 toward the second steering angle D2 when the state of the vehicle 1 is the first state. Consequently, in the configuration, the steering angle can be changed from the first steering angle D1 to the second steering angle D2 without turning the wheel 3 with the vehicle stationary, and the wear of the wheel 3 and the increase in the electric power consumption of the actuator 13a can be reduced compared with a case in which the wheel 3 is turned with the vehicle stationary until the steering angle becomes the second steering angle D2 from the first steering angle D1.

In the present embodiment, the steering control unit 405 controls the steering angle so as to cause the steering angle to start to be directed from the first steering angle D1 toward the second steering angle D2 when the state of the vehicle 1 is the stationary state midway through the process during which the first state is switched to the second state. Consequently, in the configuration, the wheel 3 is turned with the vehicle stationary only in a partial section in the process during which the steering angle is directed from the first steering angle D1 toward the second steering angle D2, and the wear of the wheel 3 and the increase in the electric power consumption of the actuator 13a can be reduced compared with a case in which the wheel 3 is turned with the vehicle stationary in the entire section in the process during which the steering angle becomes the second steering angle D2 from the first steering angle D1.

In the present embodiment, the detection unit 402 detects the distance L between the obstacle B in front of the vehicle 1 in a stationary state and the obstacle B in the rear of the vehicle 1. If the distance L is equal to or more than the threshold, the steering control unit 405 controls the steering angle so as to cause the steering angle to start to be directed from the first steering angle D1 toward the second steering angle D2 when the state of the vehicle 1 is the first state. In contrast, if the distance L is less than the threshold, the steering control unit 405 controls the steering angle so as to cause the steering angle to start to be directed from the first steering angle D1 toward the second steering angle D2 when the state of the vehicle 1 is the stationary state midway through the process during which the first state is switched to the second state. Consequently, in the configuration, the amount of turning of the wheel 3 with the vehicle stationary is adjusted in accordance with the distance L to enable the vehicle 1 to escape from between the obstacles B.

In the present embodiment, the driving assistance unit 400 includes the travel route calculation unit 404 that calculates the travel route from the current position of the vehicle 1 to the target position. Consequently, in the configuration, the travel route from the current position of the vehicle 1 to the target position can be calculated.

A computer program to be executed by the driving assistance unit 400 according to the present embodiment may be recorded and provided in a computer-readable recording medium such as a compact disc read only memory (CD-ROM), a flexible disk (FD), a compact disc recordable (CD-R), and a digital versatile disc (DVD), as an installable or executable file.

The computer program to be executed by the driving assistance unit 400 according to the embodiment may be stored in a computer connected to a network such as the Internet and provided by being downloaded via the network. The computer program to be executed by the driving assistance unit 400 according to the embodiment may be provided or distributed via a network such as the Internet.

Although the embodiment of the present invention has been described, the embodiment is presented by way of example and does not intend to limit the scope of the present invention. The embodiment and modifications can be performed in other various forms, and various omissions, substitutions, combinations, and modifications can be made without departing from the gist of the invention. Specifications such as configuration and shape (structure, type, direction, shape, size, length, width, thickness, height, number, arrangement, position, material, and the like) can be changed as appropriate to be performed. The driving assistance performed by the vehicle 1 may be parking assistance (entry assistance), for example.

EXPLANATIONS OF LETTERS OR NUMERALS

1 Vehicle
3 Wheel
400 Driving assistance unit
402 Detection unit
404 Travel route calculation unit
405 Steering control unit
B Obstacle
D1 First steering angle
D2 Second steering angle
D3 Third steering angle

The invention claimed is:

1. A driving assistance device comprising
an electronic control unit including a steering control unit that, in the case of changing a steering angle of a wheel of the vehicle from a first steering angle on one side of a neutral position to a second steering angle on another side of the neutral position when a state of the vehicle is switched from a first state to a second state, is configured to control the steering angle so as to cause the steering angle to start to be directed from the first steering angle toward the second steering angle before the state of the vehicle becomes the second state, and to control the steering angle so as to cause the steering angle to be directed from a third steering angle in between the first steering angle and the second steering angle toward the second steering angle when the state of the vehicle is the second state, the first state being one of an advancing state and a reversing state, the second state being another of the advancing state and the reversing state; and
a detector that detects a distance between an obstacle in front of the vehicle in a stationary state and an obstacle in the rear of the vehicle,
wherein the steering control unit is configured to control the steering angle so as to cause the steering angle to start to be directed from the first steering angle toward the second steering angle when the state of the vehicle is the first state when the distance is equal to or more than a threshold, and to control the steering angle so as to cause the steering angle to start to be directed from the first steering angle toward the second steering angle when the state of the vehicle is a stationary state midway through a process during which the first state is switched to the second state when the distance is less than the threshold.

2. The driving assistance device according to claim 1, wherein the electronic control unit further comprising a travel route calculation unit that calculates a travel route from a current position of the vehicle to a target position.

3. A driving assistance method, comprising:
in the case of changing a steering angle of a wheel of the vehicle from a first steering angle on one side of a neutral position to a second steering angle on another side of the neutral position when a state of the vehicle is switched from a first state to a second state, controlling the steering angle so as to cause the steering angle to start to be directed from the first steering angle toward the second steering angle before the state of the vehicle becomes the second state, and controlling the steering angle so as to cause the steering angle to be directed from a third steering angle in between the first steering angle and the second steering angle toward the second steering angle when the state of the vehicle is the second state, the first state being one of an advancing state and a reversing state, the second state being another of the advancing state and the reversing state;
detecting a distance between an obstacle in front of the vehicle in a stationary state and an obstacle in the rear of the vehicle, and
controlling the steering angle so as to cause the steering angle to start to be directed from the first steering angle toward the second steering angle when the state of the vehicle is the first state when the distance is equal to or more than a threshold, and controlling the steering angle so as to cause the steering angle to start to be directed from the first steering angle toward the second steering angle when the state of the vehicle is a stationary state midway through a process during which the first state is switched to the second state when the distance is less than the threshold.

4. The driving assistance method according to claim 3, further comprising calculating a travel route from a current position of the vehicle to a target position.

* * * * *